(12) United States Patent
Chen et al.

(10) Patent No.: US 8,565,774 B2
(45) Date of Patent: Oct. 22, 2013

(54) SERVING-GRANT ALLOCATION METHOD FOR HIGH-SPEED UPLINK PACKET ACCESS SYSTEMS

(75) Inventors: Bin Chen, Shenzhen (CN); Hongcheng Zhuang, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 2033 days.

(21) Appl. No.: 11/455,221

(22) Filed: Jun. 15, 2006

(65) Prior Publication Data

US 2007/0183359 A1    Aug. 9, 2007

(30) Foreign Application Priority Data

Feb. 8, 2006  (CN) .......................... 2006 1 0054628

(51) Int. Cl.
*H04W 72/00*   (2009.01)
(52) U.S. Cl.
USPC .......................................... 455/450; 370/328
(58) Field of Classification Search
None
See application file for complete search history.

(56) References Cited

U.S. PATENT DOCUMENTS

| | | | | |
|---|---|---|---|---|
| 7,646,746 B2 * | 1/2010 | Jiang | ............................. | 370/328 |
| 7,801,549 B2 * | 9/2010 | Bucknell et al. | ............. | 455/522 |
| 2007/0025300 A1 * | 2/2007 | Terry et al. | .................... | 370/335 |
| 2007/0036108 A1 * | 2/2007 | Benoist | ......................... | 370/331 |

FOREIGN PATENT DOCUMENTS

| | | |
|---|---|---|
| CN | 1366263 A | 8/2002 |
| CN | 1567898 A | 1/2005 |
| CN | 1921683 A | 2/2007 |
| JP | 2002352145 A | 12/2002 |
| WO | WO 01/52448 A1 | 7/2001 |

OTHER PUBLICATIONS

3rd Generation Partnership Project; Technical Specification Group Radio Access Network; Medium Access Control (MAC) Protocol Specification (Release 6) 3GPP TS 25.321 V6.7.0 (Dec. 2005).
3rd Generation Partnership Project; Technical Specification Group Radio Access Network; Radio Resource Control (RRC); Protocol Specification (Release 6) 3GPP TS 25.331 V6.8.0 (Dec. 2005).
European Patent Application No. 07702085.7, Supplementary European Search Report, 11 pages, May 14, 2009.

(Continued)

*Primary Examiner* — Justin Lee
(74) *Attorney, Agent, or Firm* — Huawei Technologies Co., Ltd

(57) ABSTRACT

The present invention provides a serving-grant allocation method for a high-speed uplink packet access system. It includes these steps: a. Transmission of the serving-grant initial allocation message to mobile subscribers via network; b. The mobile subscriber decides whether setting the stored-secondary-grant is needed based on the initial allocation message description. If it is needed, then set the stored-secondary-grant to the value indicated in the aforementioned initial allocation message. The present invention solves problems such as the mobile subscriber can not allocate stored-secondary-grant during wireless channel allocation, or the primary/secondary grant can only allocate one out of the two, and the subsequent process issues that occur as a result of stored-secondary-grant not being set up during the initial allocation with the existing technology. The present invention effectively enhances the usage of the wireless channel and network's capacity to exercise control over mobile subscribers, thereby reducing system complexity, and improving system performance.

10 Claims, 6 Drawing Sheets

(56) References Cited

OTHER PUBLICATIONS

3GPP Organizational Partners, "3$^{rd}$ Generation Partnership Project; Technical Specification Group Radio Access Network; Medium Access Control (MAC) Protocol Specification (Release 6)," 86 pages, Sep. 2005.

Huawei, "E-DCH Serving Grant Update," 3$^{rd}$ Generation Partnership Project, TSG-RAN2 Meeting #51, Denver, Colorado, 6 pages, Jan. 23, 2006.

Siemens, "EDCH Identity Priority," 3$^{rd}$ Generation Partnership Project, TSG-RAN2 Meeting #43, Shin Yokohama, Japan, 2 pages, Nov. 15-19, 2004.

3GPP TS 25.321 V6.7.0 (Dec. 2005) 3$^{rd}$ Generation Partnership Project; Technical Specification Group Radio Access Network; Medium Access Control (MAC) protocol specification (Release 6).

3GPP TS 25.331 V6.8.0 (Dec. 2005) 3$^{rd}$ Generation Partnership Project; Technical Specification Group Radio Access Network; Medium Access Control (MAC) protocol specification (Release 6).

Translation of Written Opinion of the International Searching Authority for PCT/CN2007/000153 mailed May 3, 2007.

* cited by examiner

SERVING-GRANT ALLOCATION METHOD FOR HIGH-SPEED UPLINK PACKET ACCESS SYSTEMS

CROSS-REFERENCES TO RELATED APPLICATIONS

This application claims priority to Chinese Patent Application No. 200610054628.5, filed Feb. 8, 2006, commonly assigned, incorporated by reference herein for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to high-speed uplink packet access technology. In particular, the present invention relates to a serving-grant allocation method for high-speed uplink packet access systems.

Since the release of REL6, 3GPP (the 3rd Generation Partnership Project) offers high-speed uplink packet access (HSUPA: High-speed Uplink Packet Access) technology that provides high-speed transmission in air interface for uplink packets. This type of high-speed uplink packet access technology adopts Hybrid Automatic Repeat Request (HARQ: Hybrid Automatic Repeat Request) technology, base station (Node B) quick scheduling technology and uplink 2 ms short frame technology, which significantly enhances data throughput rate for uplink users. Air interface peak value speed has reached as high as 5.76 Mbps, and system uplink capacity has also improved considerably.

HSUPA is achieved through interaction between Enhanced Dedicated Channel (E-DCH), E-DCH Dedicated Physical Control Channel (E-DPCCH), E-DCH Dedicated Physical Data Channel (E-DPDCH), EDCH Hybrid ARQ Indicator Channel (E-HICH), E-DCH Relative Grant Channel (E-RGCH), and E-DCH Absolute Grant Channel (E-AGCH). These channels are pre-allocated during the process of establishment of channels in advance (they may be reallocated while calling). FIG. 1 is a HSUPA data transmission flowchart. As shown in FIG. 1, grant message is transmitted and scheduled to the user equipment (UE) over E-RGCH and E-AGCH by Node B; UE schedules Hybrid ARQ based on the grant message and transmits data over the transmission channel E-DCH. E-DCH is mapped to the physical channel and data is transmitted to Node B, and transmission indication message is transmitted over E-DPCCH to Node B. Node B receives E-DPCCH and E-DPDCH simultanueously, and decodes data on E-DPDCH according to the instruction of the transmission indication message over E-DPCCH. Then, Node B transmits reception results and uplink channel quality status to UE via E-HICH. Finally, this UE decides the next transmission on the basis of the message over E-HICH and in combination with the grant message over E-RGCH and E-AGCH.

The scheduled grant message sent from Node B to the user via E-AGCH/E-RGCH decides the HSUPA transmission resource that the mobile subscriber may use. Among these, absolute scheduling grant message is transmitted over E-AGCH, and the message may directly designate the HSUPA transmission resource that the mobile subscriber may use. Relative scheduling grant message is transmitted over E-RGCH, and after reception by the mobile subscriber, the mobile subscriber increases or decreases the currently available transmission resource according to the designated ratio. Absolute schedule grant in E-AGCH can be classified into two types: one type is the primary grant, which is identified by the primary E-RNTI (E-RNTI is the E-DCH wireless network temporary identifier, which is the identification code of the mobile subscriber in HSUPA. It is divided into the primary E-RNTI and secondary E-RNTI, and it is allocated by the SRNC during channel setup), the primary E-RNTI will be directly set in the mobile subscriber as a variable, which is called serving-grant (Serving-Grant), and the mobile subscriber is depending on the value of the variable to judge the available HSUPA transmission resource. The other type is the secondary grant, which is identified by the secondary E-RNTI. The secondary grant is set to serving-grant only under conditions where the primary identifier is unavailable. Otherwise it may be stored to the stored-secondary-grant, which is another variable in the mobile subscriber that should be set to the serving-grant in the future, when the primary identifier becomes invalid. The serving-grant value is initially allocated by the Serving Radio Network Controller (SRNC: Serving Radio Network Controller) via the wireless channel allocation or reallocation of radio resource control (RRC: Radio Resource Control) information.

The initial allocation message of the serving-grant value containing the aforementioned wireless channel allocation or reallocation of radio resource control information includes two parts: the first part is the serving-grant value, and the other is the primary/secondary grant selector, which is used to clarify whether the serving-grant value is allocated through the primary E-RNTI or the secondary E-RNTI, as shown in Table 1.

TABLE 1

| Serving-grant allocation message in the RRC message. | | | | |
|---|---|---|---|---|
| >Serving-grant | Selective | | | REL-6 |
| >>Serving-grant value | Required | Integer $(0 \ldots 37, 38)$ | The value in table 9.2.5.2.1.1 in TS25.321 corresponding to 0-37, 38 indicated value is 0. | REL-6 |
| >>Primary/secondary grant selector | Required | Enumerate: {"Primary", "Secondary"} | Indication serving-grant is received via primary E-RNTI or secondary E-RNTI | REL-6 |

When the mobile subscriber received the initial allocation message as shown in Table 1, the following process flow is carried out (as shown in FIG. 2).

In step S10, decide whether or not the initial allocation message contains Serving-Grant option. If serving-grant option is included, then set the variable for serving-grant to the value indicated by the serving-grant value contained in the initial allocation message (the serving-grant value contained in the initial allocation message corresponds to the indicated value. For information on correspondence relationship of values 0~37, please refer to 3GPP TS25.321 v6.7.0 Table 9.2.5.2.1.1, value indicated by value 38 is zero-grant) (step S11), then proceed to step S12, otherwise proceed to step S15.

Step S12 decides whether the primary/secondary selector is selected as "Primary", if it is, proceed to step S13, otherwise proceed to step S14.

Step S13 sets primary grant available variable (Primary_Grant_Available) to "True". That is, serving-grant will be set to primary schedule grant in E-AGCH during HSUPA operation. Execute step S16.

Step S14 sets primary grant available variable to "False". That is, serving-grant will be set to secondary schedule grant in E-AGCH during HSUPA operation. Execute step S16.

Step S15 sets serving-grant (Serving-Grant) to zero-grant (Zero-Grant) and allocates primary grant available variable to "True". Execute step S16.

Step S16 allocates stored-secondary-grant (Stored-secondary-grant) variable to zero value.

It is clear from FIG. 2 that regardless whether or not the serving-grant value is allocated, and regardless of the Primary/Secondary selector, stored-secondary-grant is always zero value. That is, stored-secondary-grant of the mobile subscriber cannot be allocated at the time of wireless channel allocation or reallocation, and primary/secondary grant allocation can only select one out of the two by primary/secondary selector. This results in network inflexibility with regards to control and allocation of relative variables of the mobile subscribers. This, in turn, will reduce the network's capacity to exercise control over the mobile subscriber. Because, in such a case, during primary/secondary schedule grant switching, the secondary schedule grant can only be set by Node B in real time. Meanwhile, Node B must transmit an additional E-AGCH channel message to allocate the variable, which decreases channel usage, adds system-processing complexity, and reduces system performance.

In addition, there may arise the following two problems as well:

(1) When the initial allocation grant is the primary type, when switched to secondary E-RNTI during execution, serving-grant=stored-secondary-grant=0, because the initial stored-secondary-grant is 0. This probably is not what Node B preferred.

(2) When the initial allocation grant is the secondary type, the stored-secondary-grant is also 0; this differs with the process during execution. In execution, when sending the absolute grant over the secondary E-RNTI, the absolute grant value is stored in the stored-secondary-grant. Thus, after initialization, if Node B does not further transmit the grant, and if UE switched to the primary E-RNTI and again switched back to secondary E-RNTI, it may result in serving-grant value being zero-grant. In this way, UE will not be able to transmit data; this also will not be what Node B hoped for. Also, the process logic from the beginning to the end is different upon execution of the stored-secondary-grant to the same variable. From a logical protocol standpoint, this is a problem.

BRIEF SUMMARY OF THE INVENTION

In order to solve the abovementioned problems, the purpose of the present invention is to provide a serving-grant allocation method for high-speed uplink packet access systems that allocates the stored-secondary-grant value in the mobile subscriber with flexibility, and based on the initial allocation message of the serving-grant received by the mobile subscriber. Thus, allocation of serving-grant and stored-secondary-grant are independent from each other, in order to realize the allocation of the stored-secondary-grant, and Node B is no longer required to allocate stored-secondary-grant values via E-AGCH. This not only saves channel bandwidth, and enhances wireless channel usage, but also improves network's power to control the mobile subscriber, reduces system complexity, and improves system performance.

In order to attain the aforementioned purpose, the technical proposal of the present invention is a serving-grant allocation method for a high-speed uplink packet access system which includes:

a. transmitting of a serving-grant initial allocation message to user equipment (UE) via a network;

b. the mobile subscriber deciding whether setting a stored-secondary-grant is needed based on the initial allocation message; if it is needed, then setting the stored-secondary-grant to a value indicated in the aforementioned initial allocation message.

In the aforementioned step b, if a serving-grant value in the initial allocation message is decided that it is not secondary, then setting the aforementioned stored-secondary-grant to a zero value.

The aforementioned initial allocation message includes a serving-grant value and a primary/secondary grant selector.

The aforementioned step b includes:

when the aforementioned primary/secondary grant selector is selected "secondary", deciding the needed setting is the stored-secondary-grant, then setting the aforementioned stored-secondary-grant to a value indicated in the serving-grant value of the aforementioned initial allocation message.

Step b also includes:

when the aforementioned primary/secondary grant selector is "secondary", setting a primary grant available to "False".

The aforementioned initial allocation message includes: primary serving-grant value and/or secondary serving-grant value.

The aforementioned step b. includes:

b1. setting a serving-grant and a primary-grant available according to whether or not the aforementioned initial allocation message includes the primary serving grant value;

b2. when the aforementioned initial allocation message includes the secondary serving-grant value, deciding that setting the stored-secondary-grant is needed, then setting stored-secondary-grant to a value indicated by the secondary serving-grant value in the aforementioned initial allocation message;

b3. when the aforementioned initial allocation message does not include secondary serving grant value, deciding setting of stored-secondary-grant is not needed, then setting the stored-secondary-grant to a zero value.

Step b1 includes:

if the aforementioned initial allocation message includes the primary serving-grant value, setting the serving-grant to a value indicated in the primary serving-grant value of the aforementioned initial allocation message, and setting the primary grant available to "True";

if the aforementioned initial allocation message does not include the primary serving-grant value, setting the serving grant to the zero value and the primary grant available to "False".

After step b2 also includes:

if the aforementioned initial allocation message includes the secondary serving-grant value and the primary grant available is false, then setting the serving grant to the value indicated in the secondary serving-grant value.

Step b3 also includes:

setting the primary grant available to true.

Step b3 also includes:

when deciding the allocation message does not include the primary serving-grant value, setting a primary grant available to "True".

The aforementioned initial allocation message includes a primary serving-grant value, a primary/secondary grant selector and the stored-secondary-grant value.

The aforementioned step b includes:

deciding whether or not the aforementioned initial allocation message includes the stored-secondary-grant value; if it does, deciding the setting of stored-secondary-grant is needed, then setting the stored-secondary-grant to the value indicated by the stored-secondary-grant value included in the aforementioned initial allocation message, otherwise setting the stored-secondary-grant to the zero value.

The beneficial effects of the present invention lie in the solution of problems such as mobile subscriber cannot allocate stored-secondary-grant during wireless channel allocation, or the primary/secondary grant can only allocate one out of the two, and the subsequent process issue that occurs as a result of a stored-secondary-grant that was not set during the initial allocation with the existing technology. The present invention effectively enhances usage of the wireless channel and the power of the network to exercise control over mobile subscribers, thereby reducing system complexity, and improved system performance.

DETAILED DESCRIPTION OF THE INVENTION

The embodiment of the present invention is described in detail with reference to the drawings below.

Working Example 1

Figure 1:
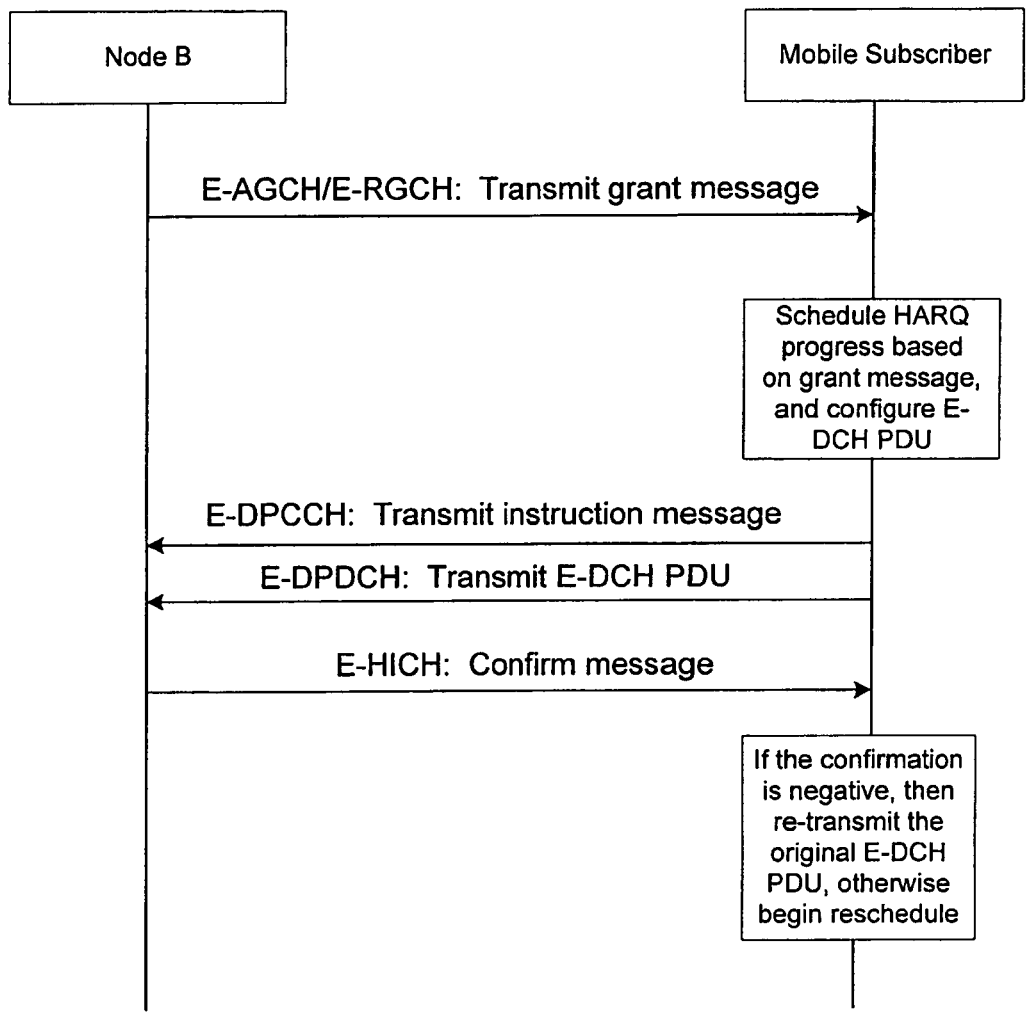
FIG. 1 is a flowchart of the HSUPA data transmission.
Figure 2:
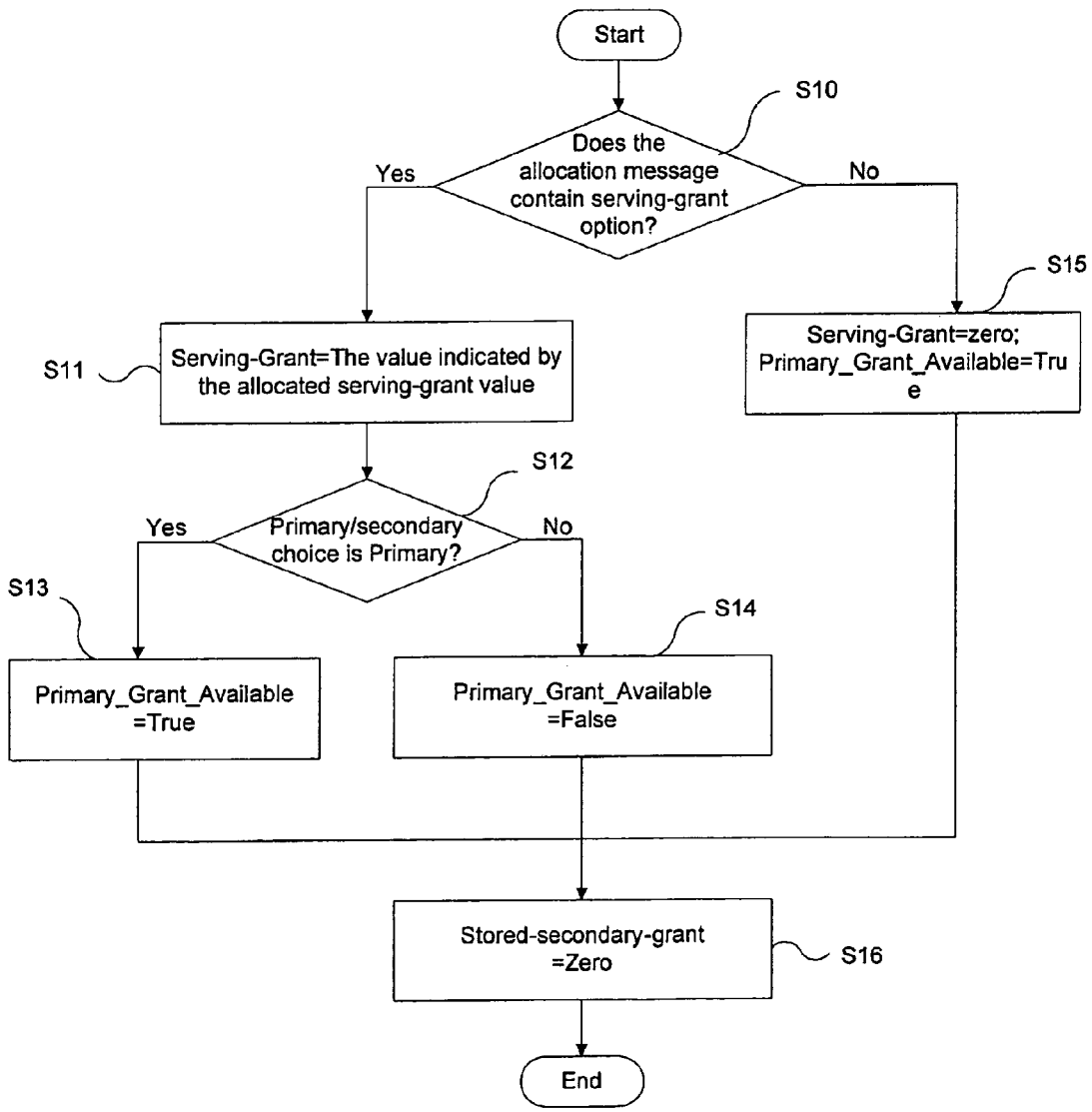
FIG. 2 is a flowchart of serving-grant allocation of the existing technology.
Figure 3:
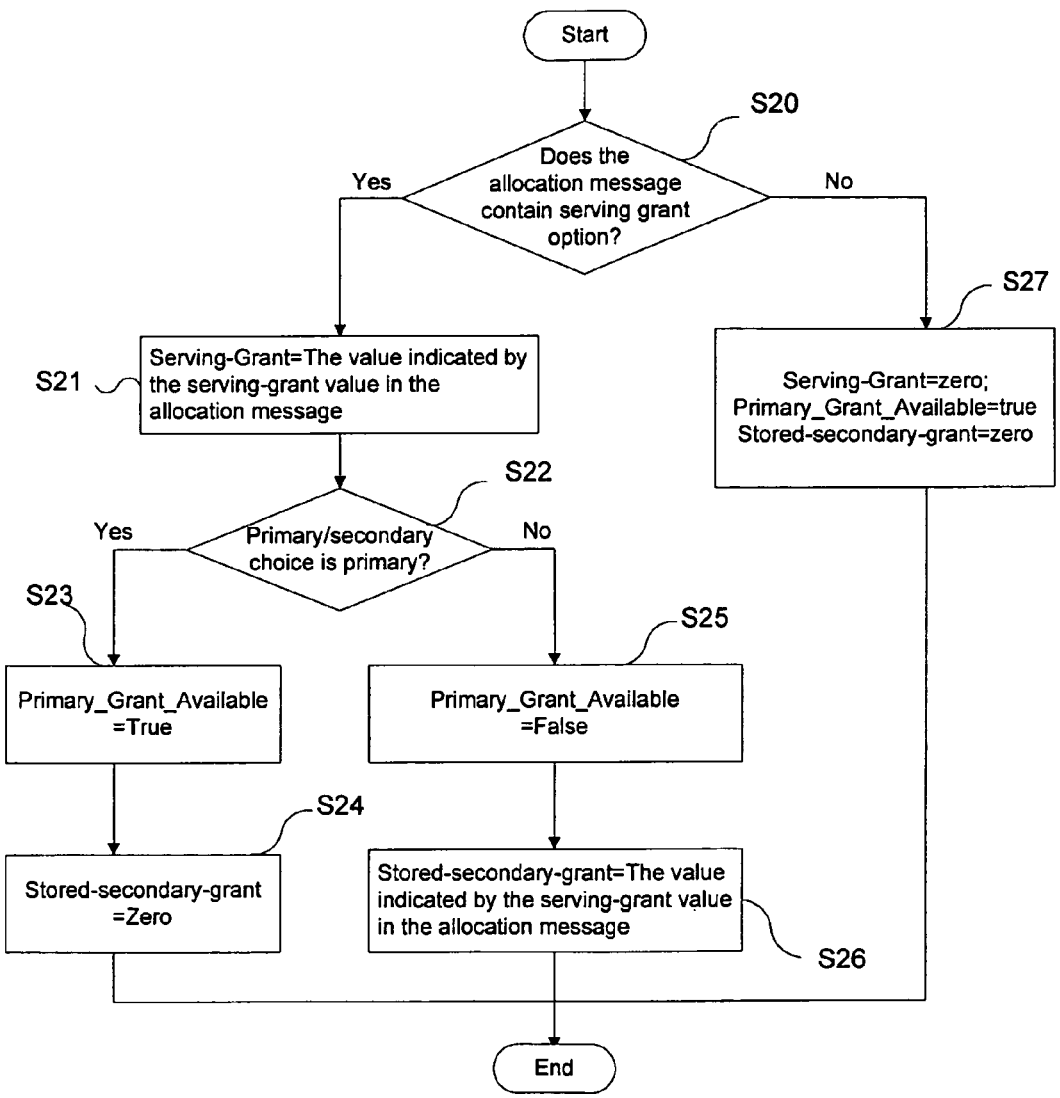
FIG. 3 is a flowchart of serving-grant allocation of working example 1 in the present invention.

The present invention realizes individual allocation of serving grant and stored-secondary-grant for mobile subscribers and achieves the goal of allocating the stored-secondary-grant via changing the serving-grant allocation flow in mobile subscribers, and under conditions where there is no change in the current serving-grant allocation message. FIG. 3 is a flowchart of serving-grant allocation of the working example 1 in the present invention. This working example adopts the existing initial allocation message of serving-grant in RRC message as shown in Table 1, and, as shown in FIG. 3, the mobile subscriber executes the following process flow after receiving serving-grant initial allocation message in the aforementioned RRC message:

First, decide whether the allocation message contains a serving-grant option, based on the initial allocation message in RRC message (step S20). If the result of the decision is that the initial allocation message contains a serving-grant option, then execute step S21, otherwise execute S27.

In step S21, set serving-grant variable to the value indicated by serving-grant value in the initial allocation message, and advance to step S22.

In step S22, decide whether the primary/secondary grant option in the initial allocation message is "primary". If yes, then execute step S23, otherwise execute step S25.

In step S23, set primary grant available variable (Primary_Grant_Available) to "True". That is, serving-grant execution in the channel will be set by primary grant in E-AGCH. Execute step S24.

In step 24, set stored-secondary-grant variable (Stored-secondary-grant) to zero (Zero-Grant).

When the primary/secondary grant selector is "secondary" in the initial allocation message, and it requires allocation of the stored-secondary-grant, set primary grant available variable (Primary_Grant_Available) to "False". That is, serving-grant execution in the channel will be set by secondary grant in E-AGCH. Execute step S26.

In step S26, set the stored-secondary-grant variable (Stored-secondary-grant) to the value indicated by serving-grant value contained in the initial allocation message.

In step 27, set serving-grant (Serving-Grant) to zero (Zero-Grant), and set stored-secondary-grant variable (Stored-secondary-grant) to zero (Zero-Grant), and set primary grant available variable (Primary_Grant_Available) to "True". This result indicates that neither serving-grant nor stored-secondary-grant is set in SRNC, and serving-grant in the execution channel will be set by primary grant in E-AGCH. In the allocation method of the existing technology, regardless whether the serving-grant value is allocated, and regardless of the primary/secondary selector. Stored-Secondary-Grant is always zero. Namely, stored-secondary-grant of the mobile subscriber cannot be allocated at the time of allocating or reallocating the wireless channel. With the present invention, SRNC logically executes variables in the mobile subscriber, based on the initial allocation message contained in the RRC message, (including serving-grant value and primary/secondary grant value received by the mobile subscriber) and then allocates these values for serving-grant and stored-secondary-grant. This solves the issue of the stored-secondary-grant (Stored-Secondary-Grant) of the mobile subscriber not being able be allocated at the same time the wireless channel is being allocated or reallocated. Through this type of allocation, Node B is no longer required to allocate initial value for stored-secondary-grant via E-AGCH, which saves channel bandwidth, and simplifies Node B processing complexity. It also strengthens the network power to exercise control cover the mobile subscriber, thus improving system's capabilities.

Moreover, the present invention not only solves the problem of the initial value not being able to be allocated to the stored-secondary-grant, but also solves the subsequent processing problem caused by the initial value not being able to be allocated to the stored-secondary-grant with the existing technology.

When the primary and secondary selector in the initial allocation message is "secondary", the value of the stored-secondary-grant is set to the value indicated in the serving-grant value in the initial allocation message. In the execution process, after switching to primary E-RNTI and switching back to secondary E-RNTI, the allocated stored-secondary-grant value will be set to serving-grant. At this time, the mobile subscriber may continuously possess the HSUPA resource to send out data. This is fully consistent with the executing process and therefore, presents no logical inconsistency problem with the existing technology. (This is in agreement with the process that is executing, and thus it does not have logical inconsistence problem with the existing technology.)

Working Example 2

The present invention may also amend the initial allocation message (Table 1) in the current standard TS25.331 v6.8.0, so that SRNC may allocate serving-grant (Serving-Grant), primary grant available (Primary Grant_Available), and stored-secondary-grant (Stored-Secondary-Grant) simultaneously. The serving-grant allocation message of this working example is shown in Table 2.

TABLE 2

The serving-grant allocation message of the present invention

| >Serving-grant | Selectable | | | REL-6 |
| --- | --- | --- | --- | --- |
| >>Primary serving-grant value | Selectable | Integer (0 . . . 37, 38) | The value in table 9.2.5.2.1.1 of TS25.321 corresponding with 0~37, the value indicated in 38 is 0 | REL-6 |
| >>Secondary serving-grant value | Selectable | Integer (0 . . . 37, 38) | The value in table 9.2.5.2.1.1 of TS25.321 corresponding to 0~37, the value indicated in 38 is 0 | REL-6 |

The aforementioned mode of allocation message is not the only mode. There are other modes, for example, the allocation message may also contain primary serving-grant value and/or secondary serving-grant value, based on the aforementioned allocation message execution serving-grant variable in the Mobile subscriber, as shown in Table 3. In Table 2 and Table 3, the primary serving-grant and secondary serving-grant are all selectable selectors, which may be included in the allocation message at the same time or only include either one.

TABLE 3

The serving-grant allocation message of the present invention

| >Primary serving-grant value | Selectable | Integer (0 . . . 37, 38) | The value in table 9.2.5.2.1.1 of TS25.321 corresponding to 0~37, the value indicated in 38 is 0 | REL-6 |
| --- | --- | --- | --- | --- |
| >Secondary serving-grant value | Selectable | Integer (0 . . . 37, 38) | The value in table 9.2.5.2.1.1 of TS25.321 corresponding to 0~37, the value indicated in 38 is 0 | REL-6 |

Figure 4:
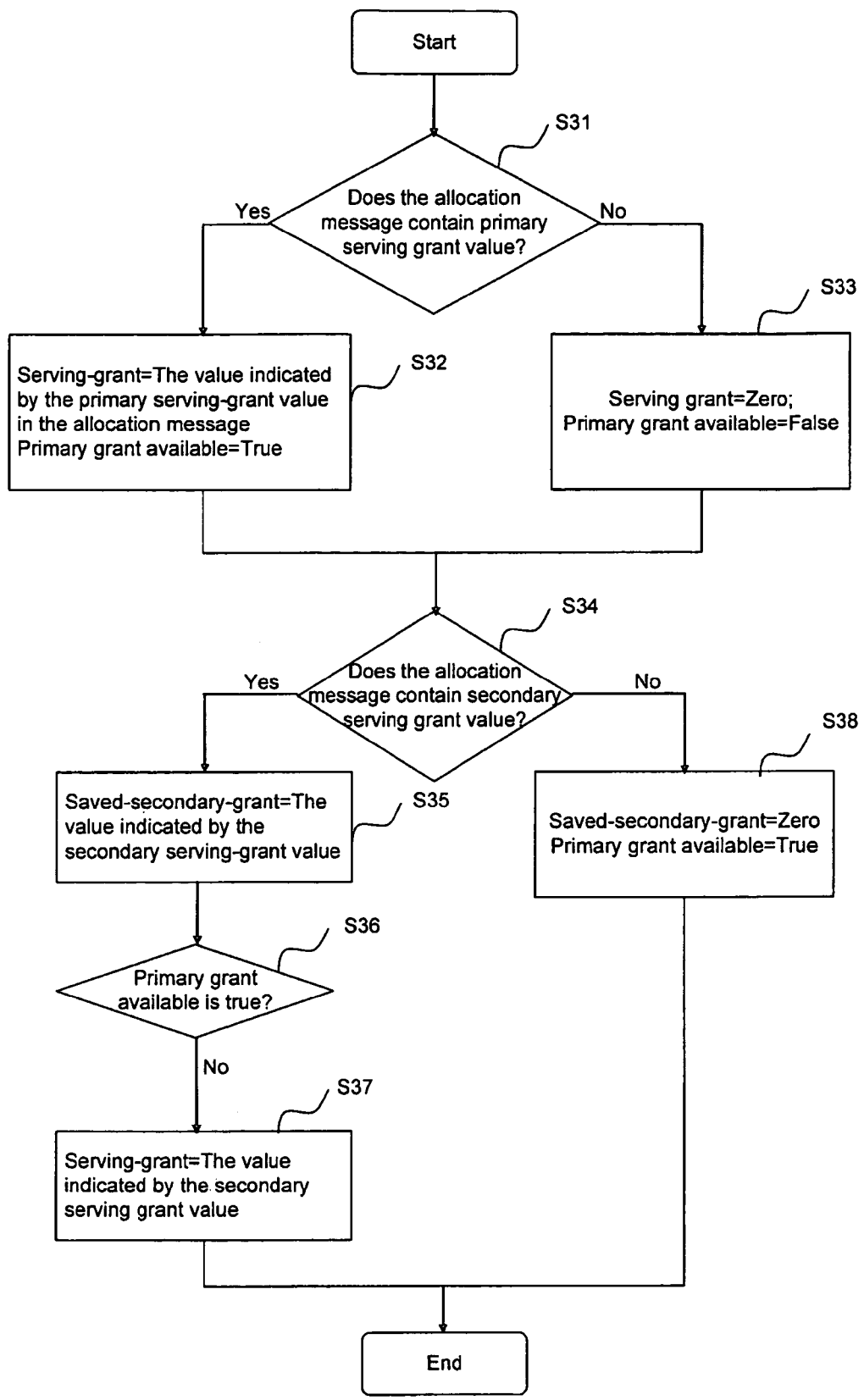
FIG. 4 is a flowchart of serving-grant allocation of working example 2 in the present invention.

Allocation of initial schedule grant variable in the mobile subscriber can be executed by taking the primary/secondary serving-grant value indicated in Table 2 or Table 3 as the initial primary/secondary serving-grant value. The allocation flow for the mobile subscriber is as shown in FIG. 4.

First, decide whether or not the initial allocation message includes primary serving-grant value (Primary Serving Grant value) (step S31).

If it contains primary serving-grant value, then advance to step S32 and set the variable for available primary serving-grant to "true", and set the variable for serving-grant Serving-Grant to the value indicated by the primary serving-grant value in the initial allocation message.

If it does not contain primary serving-grant value, then advance to step S33. Set the variable for serving-grant to zero, and set the variable for primary serving-grant available to "False", and then set the stored-secondary-grant, based on whether or not the initial allocation message contains the stored-secondary-grant value.

In step S34, decide whether or not the initial allocation message contains stored-secondary-grant value (Secondary Serving Grant value). If no stored-secondary-grant value is contained, then directly set stored-secondary-grant to zero, and set the available primary grant to True (step S38). If you determine that there is a stored-secondary-grant value contained in the initial allocation message, that is, you determine that allocation of stored-secondary-grant is required, then advance to step S35.

In step S35, set the stored-secondary-grant (Stored-Secondary-Grant) variable to the value indicated by the stored-secondary-grant value in the initial allocation message.

In step S36, decide whether available primary grant is true; if it is true, then do nothing. Otherwise, advance to step S37.

In step S37, when available primary grant is "False", set serving-grant to the value indicated in the secondary serving-grant value in the initial allocation message. The process is now complete.

It is clear from the process flowchart of the present invention that the present invention is capable of allocating serving-grant, stored-secondary-grant, and available primary grant concurrently via the method of separately allocating primary/secondary serving-grant. There is therefore no danger of conflict and mutex (mutual cancellation) among these allocations, and thus, flexible/dynamic allocation can be realized. This solves another problem found in the existing technology—that allocation of primary and secondary grant has to be selected one at a time.

Working Example 3

Figure 5:
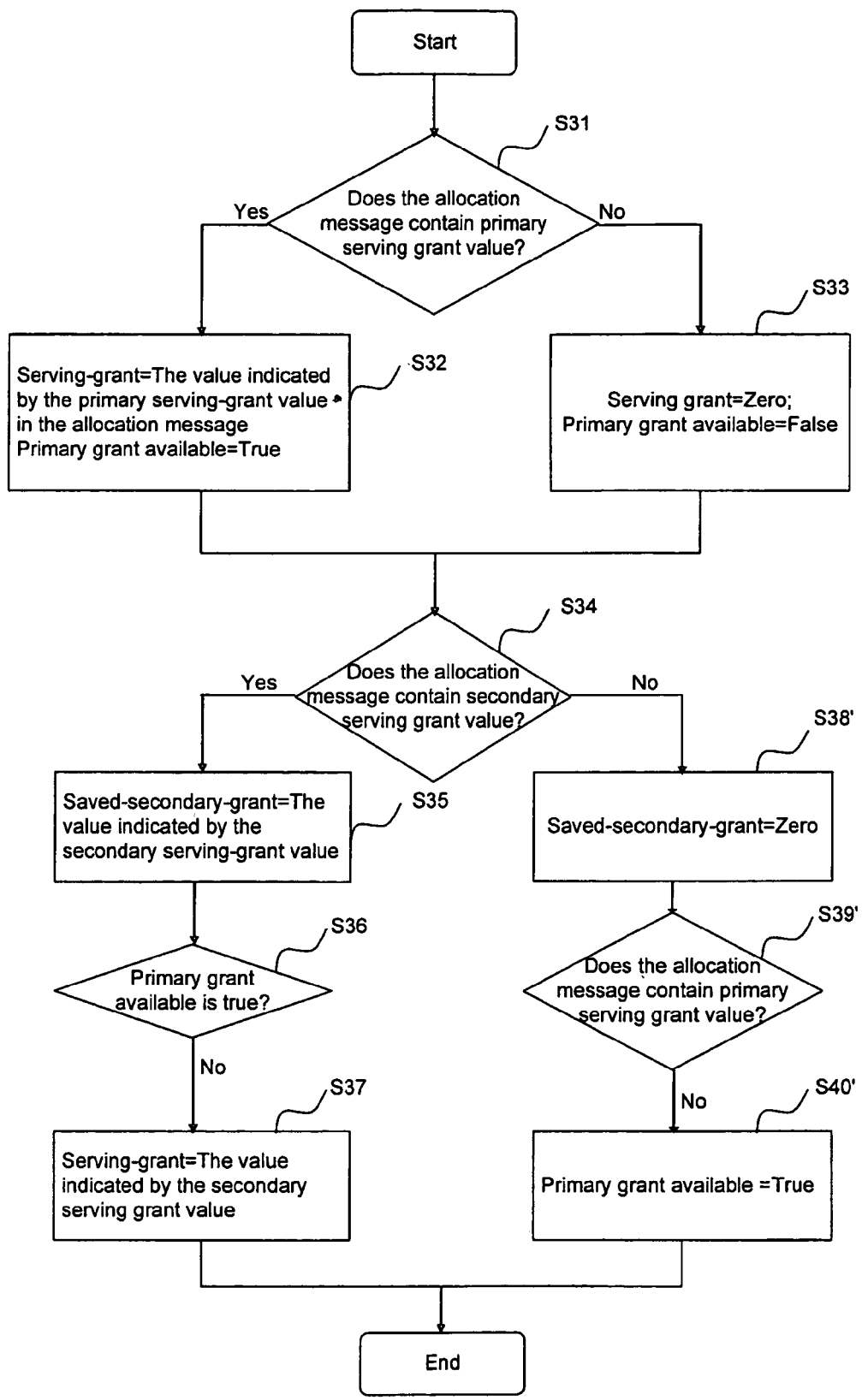
FIG. 5 is a flowchart of serving-grant allocation of working example 3 in the present invention.

The mobile subscriber also may adopt the flow process indicated in FIG. 5, using the allocation message of the present invention (Table 2 or Table 3). The only difference with the flow shown in FIG. 4 is that, in step S34, when decided that no serving-grant is contained in the initial allocation message, you should set the stored-secondary-grant to zero (step S38'), and decide whether the initial allocation message contains primary serving grant value (step S39'); if it does not, then set the primary grant available to true (step S40'). This result indicates that SRNC has not allocated serving-grant and stored-secondary-grant, and that the serving grant will be set by the primary grant while the channel is executing. This working example may also achieve the effectiveness of the working example 2 of the present invention.

Working Example 4

Figure 6:
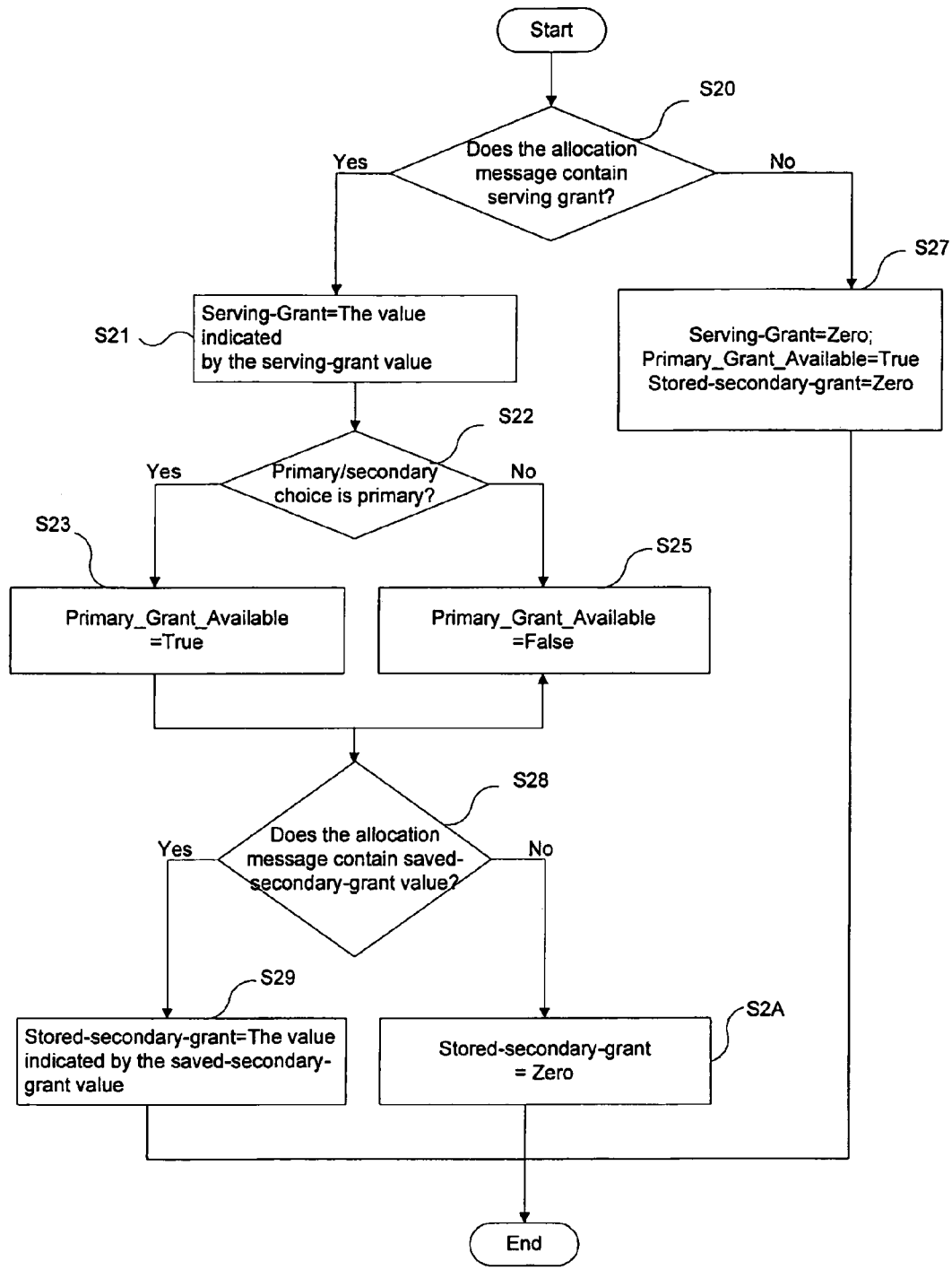
FIG. 6 is a flowchart of serving-grant allocation of working example 4 in the present invention.

It is also acceptable to allocate initial grant through the initial allocation message in Table 4, which is defined by the present invention. The concrete allocation flowchart is shown in FIG. 6.

TABLE 4

Allocation message of serving-grant in the present invention (working example 4)

| >Serving-grant | Selectable | | | REL-6 |
|---|---|---|---|---|
| >>Serving-grant value | Required | Integer (0 ... 37, 38) | The value in table 9.2.5.2.1.1 of TS25.321 corresponding to 0~37, the value indicated in 38 is 0 | REL-6 |
| >>Primary/secondary grant selector | Required | Enumerate: {"Primary", "Secondary"} | Indicate whether serving-grant is received via primary E-RNTI or secondary E-RNTI | REL-6 |
| >>Stored-secondary-grant value | Selectable | Integer (0 ... 37, 38) | The value in table 9.2.5.2.1.1 of TS25.321 corresponding to 0~37, the value indicated in 38 is 0 | REL-6 |

In this working example, the execution of the primary serving grant value and primary/secondary grant selector are similar to working example 1 of the present invention. However, when primary/secondary selector is secondary, no stored-secondary-grant will set. Stored-secondary-grant will set only if stored-secondary-grant value is contained in the allocation message. The concrete execution steps are described below.

Steps S21, S22, S23, S25, and S27 are identical with the working example 1 of the present invention. The differences are that working example 4 eliminated steps S24 and S26, and added the process steps S28, S29, and S2A. The details are as follows.

Execution of step S28 is carried out after the steps S23 and S25, to decide whether the initial allocation message contains stored-secondary-grant value. If yes, then set stored-secondary-grant to the value indicated by the stored-secondary-grant value in the initial allocation message (step S29). Otherwise, set stored-secondary-grant to zero (step S2A)

This working example permits the allocation of stored-secondary-grant and serving-grant independently to each other; this provides greater flexibility.

In summary, the present invention implements a serving-grant allocation method for high-speed uplink packet access systems that resolves the following problems: the stored-secondary-grant cannot be allocated during wireless channel allocation and reallocation for mobile subscribers, or the primary/secondary grant can only allocate one out of the two, and the subsequent process issue that occurs when the stored-secondary-grant was not set during the initial allocation with the existing technology. Through this method, Node B is no longer required to notify E-AGCH separately to allocate the initial value for the stored-secondary-grant, This new allocation method conserves channel bandwidth, reduces system complexity, and enhances system performance.

The above embodiments are solely used for the purpose of describing the present invention, not intended to limit the scope of the present invention.

What is claimed is:

1. A serving-grant allocation method for use by a user equipment, comprising:
   receiving initial allocation information for a serving grant initial allocation procedure, the initial allocation information comprising a serving-grant value and a primary/secondary grant selector; and
   when the primary/secondary grant selector in the initial allocation information indicates "primary", setting a variable stored-secondary-grant to be "zero grant";
   when the primary/secondary grant selector in the initial allocation information indicates "secondary" and the serving-grant value is not zero, setting the variable stored-secondary-grant to be the value of the serving-grant value indicated in the initial allocation information;
   when the primary/secondary grant selector in the initial allocation information indicates "secondary" and the serving-grant value is zero, setting the variable stored-secondary-grant to be "zero grant".

2. The method according to claim 1, further comprising:
   setting a variable primary_grant_available to be false if the primary/secondary grant selector in the initial allocation information indicates secondary.

3. The method according to claim 1, further comprising:
   setting a variable primary_grant_available to be true if the primary/secondary grant selector in the initial allocation information indicates "primary".

4. The method according to claim 1, wherein the receiving the initial allocation information comprises:
   receiving a serving-grant initial allocation message comprising the initial allocation information from a wireless network controller.

5. The method according to claim 4, wherein the serving-grant initial allocation message is contained in a radio resource control (RRC) message.

6. The method according to claim 4, wherein the wireless network controller is a Serving Radio Network Controller.

7. A user equipment, comprising:
   a receiver, configured to receive initial allocation information for a serving grant initial allocation procedure, the initial allocation information comprising a serving-grant value and a primary/secondary grant selector;
   a processing unit, configured to:
   set a variable stored-secondary-grant to be "zero grant" when the primary/secondary grant selector in the initial allocation information indicates "primary";
   set the variable stored-secondary-grant to be the value of the serving-grant value indicated in the initial allocation information when the primary/secondary grant selector in the initial allocation information indicates "secondary" and the serving-grant value is not zero;
   set the variable stored-secondary-grant to be "zero grant" when the primary/secondary grant selector in the initial allocation information indicates "secondary" and the serving-grant value is zero.

8. The user equipment according to claim 7, wherein the processing unit is further configured to set a variable primary_grant_available to be false if the primary/secondary grant selector in the initial allocation information indicates "secondary".

9. The user equipment according to claim 7, wherein the processing unit is further configured to set a variable primary_grant_available to be true if the primary/secondary grant choice in the initial allocation information indicates "primary".

10. The user equipment according to claim 7, wherein the processing unit is further configured to check whether the initial allocation information contains the primary/secondary serving-grant selector.

* * * * *